March 9, 1971
P. GREGORIO
3,568,334
APPARATUS FOR MEASURING THE PHYSIOLOGICAL REACTION TIME
TO A VISUAL OR ACOUSTIC STIMULUS
Filed June 11, 1968
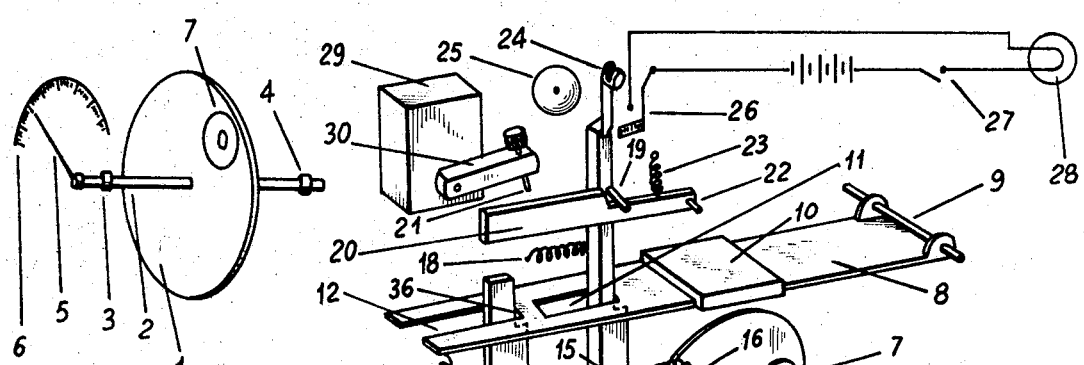
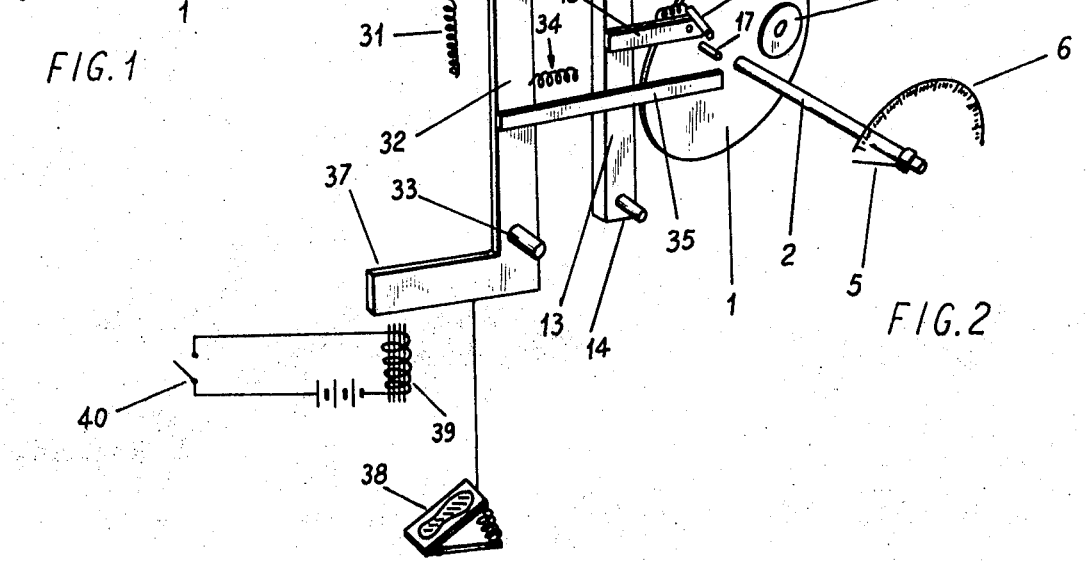
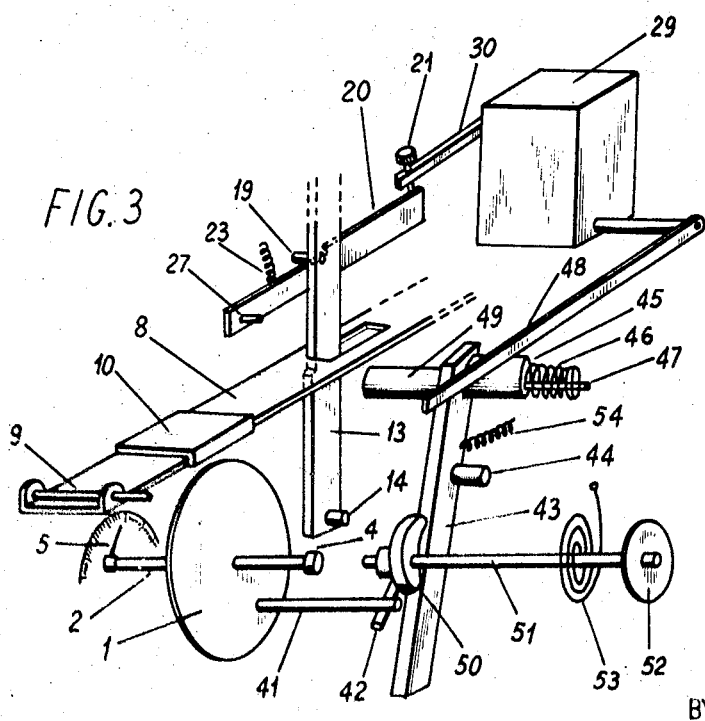
INVENTOR.
PIETRANGELO GREGORIO
BY ATTORNEYS.

United States Patent Office 3,568,334
Patented Mar. 9, 1971

3,568,334
APPARATUS FOR MEASURING THE PHYSIOLOGICAL REACTION TIME TO A VISUAL OR ACOUSTIC STIMULUS
Pietrangelo Gregorio, Naples, Italy, assignor to s.r.L. "CAEM" (Limited Company), Naples, Italy
Filed June 11, 1968, Ser. No. 736,072
Claims priority, application Italy, June 13, 1967, 31,324/67, Patent 817,919
Int. Cl. G09b 19/00
U.S. Cl. 35—22   7 Claims

ABSTRACT OF THE DISCLOSURE

A device for testing the reaction time of an individual including a rotary body rotatable about an axis spaced somewhat from its center of gravity. Timer operated release means holds the body in a position of unstable equilibrium until such time as a visual or acoustic signal is rendered when the body is released. A pointer integral with the body axle registers the angle of rotation and hence the time interval of rotation when the body is stopped by a manually operated brake.

---

Psychological testing has increased in popularity in recent years and numerous and interesting pieces of new equipment have been developed to aid industry in selecting now employees according to their abilities.

So in personnel recruiting offices as well as in many industries, employees are subjected to periodic reaction tests.

The essential devices of psychotechnics are those fitted to measure the reaction-time to a visual or acoustic stimulus: they are of various kinds and determine the time interval between the perception of the stimulus (usually the lighting of a lamp or a bell ringing) and the reaction which is accomplished by pressing a push-button or by moving a lever.

These prior art devices are based on various physical principles: from the rolling of a ball on an inclined plane, to the fall of a body, to the charge of a condenser, to complicated equipment, etc.

As times of hundredths of second are to be determined, only very complicated and expensive equipment built with careful precision, can give satisfactory results.

The device here described is based on the motion of a body about an axis which does not pass through the center of gravity of the body. It is easy running and gives fairly exact results, though it is of simple and cheap construction.

THEORETIC PRINCIPLE

A heavy body, turning about an axis which does not pass through the center of gravity of the body, subject to the force of gravity, is in equilibrium only if its center of gravity is in the vertical plane passing through the axis of rotation.

Precisely there will be unstable equilibrium if the center of gravity is in the said plane, above the axis of rotation, and there will be a stable equilibrium if the center of gravity, always lying on the said plane, is below the axis of rotation.

If we displace the turning body from its position of equilibrium and we set it free to turn, under the action of the force of gravity, it will assume a hunting motion as it is really a compound pendulum whose swings, as other forces intervene (for example those of friction, of resistance of means, etc.) will become smaller and smaller, until the body stops definitively in its position of stable equilibrium.

We are not interested in the following swings, but only in the first half-swing (i.e. the one achieved by the turning body in going from the starting point to the position nearly asymmetrical to it, in comparison with the vertical plane passing through the axis of rotation).

Obviously, the motion of the turning body, in this first swing, depends on a series of factors; just to mention some of them; the value of the local force of gravity, the distance of the center of gravity of the turning body from the axis of rotation, the total mass of the turning system, the amplitude of the initial angle between the vertical plane passing through the center of gravity and the said axis, etc.

After premising this theoretic notion to allow better understanding of the working of the device here described, there follows a specific or preferred form of the apparatus which I have designed.

In the drawings:

FIG. 1 is a perspective view of the weighted rotary disc and pointer sub-assembly;

FIG. 2 is a front perspective partly schematic of the apparatus of the invention; and FIG. 3 is a rear perspective similar to FIG. 2.

The essential part of the device is the wheel 1 (FIG. 1), fixed to the shaft 2, which turns in the bushes 3 and 4. The shaft 2 has, at the front end thereof, a hand or pointer 5, which, during the rotation, indicates on the graduated dial 6.

The system comprising the wheel, shaft, and hand is to be such as that the center of gravity of the same must not be on the axis of rotation. This can be achieved by applying to the wheel 1, far from the center, the cylinder 7 of heavy material (for instance lead, etc.). The greater the weight of the cylinder or the greater the distance thereof from the axis, the more the center of gravity will be decentralized in comparison to the axis of rotation.

If we move the wheel in such a position that the center of gravity of the whole system (wheel-axle-hand-cylinder) doesn't fall into the vertical plane, passing through the axis of rotation, and if we release it, the whole system will turn around its own axis until it reaches, almost the position symmetric to the starting position, in comparison with the vertical plane passing through the axis of rotation (almost in consequence of the inevitable frictions between them and the bushes, etc.).

In the case of FIG. 1, for example, releasing the wheel, when the center of gravity is on the right (in comparison with the vertical plane passing through the axis of rotation), the system will turn in a clockwise direction of rotation; if the system were not stopped it would continue to swing as a compound pendulum.

But, in our case, we are not interested in the following swings, but only in the first one: i.e. that leading the system (wheel-shaft-hand-cylinder) from the starting position to the one almost symmetric in comparison with the vertical plane passing through the axis.

Once we have led the wheel to its starting position (i.e. its center of gravity is not included in the vertical plane passing through the axis of rotation) there is provided a device that locks the wheel in this position and releases it as soon as a bell rings or a lamp lights (as further described).

In such a way when the bell rings or the lamp lights, the motion of the system will start. Once the motion is started, by a lever working a brake we can stop the whole system: obviously, the system—and therefore the hand will have described an angle which will be a function of the time it has required in moving the brake lever after the start, that is, the longer the delay, the greater will be the hand angle.

From the position of the hand on the graduated dial, we can measure how long it takes for a person to react in pulling down the brake lever after the start.

DETAILED DESCRIPTION

Now we shall describe in detail a preferred form of this device.

To avoid some confusion we have omitted in the drawings the supports of the various axis, bushes, etc., for example, these supports or casings can be in the form of two parallel plates as in the common alarm clocks or similar mechanisms. The elements appearing both in FIGS. 2 and 3 have common reference characters.

In FIG. 2 there are shown the elements that allow the wheel 1 to start (and therefore the system including the wheel-shaft-hand-cylinder) as soon as the bell 25 rings and/or the lamp 28 lights and also all the levers to stop the wheel itself.

The lever 13 is pivoted at 14 and sets the wheel 1 in motion as soon as the bell 25 rings and the lamp 28 lights. The lever 13 has integral therewith the arm 15, with the jack 16 at its end. When the device is ready to function (in FIG. 2), the wheel 1 (which, as its center of gravity is displaced at the upper right part, would turn in clockwise direction of rotation) is locked because the pawl 17 on the wheel rests against the jack 16.

The lever 13 passes through the slit 11 in the lever 8 which is mounted perpendicular to it. In the upper portion of lever 13 is the pawl 19 which is held against movement to the left by the joint lever 20 which is pivotally mounted at 22 and is biased upwardly up by the spring 23.

The lever 13 has mounted in the top end thereof the hammer 24, which, when the lever 13 can move left pulled by the spring 18, beats on the bell 25. At the top end, the lever 13, when it moves left, will also close the switch 26 closing the circuit of the lamp 28.

The left end of the joint lever 20 can be pushed downwards by the rocker arm 30 of the timer 29, which is of conventional construction and may be of a type found in, for instance, self-timers for cameras, etc. For greater convenience of description, we assume that the timer 29 (clearer in FIG. 3) is of the type having two levers; the lever 48 by which the timer itself is wound; and the lever 30, which, after the winding, begins to dip down slowly as a function of the charge given to the timer itself.

Returning to the joint-lever 20 (FIG. 2), the left end of the lever itself, is pushed (after a certain interval of time) downwards by the arm 30 of the timer 29. Under the action of the push (in FIG. 2 we see clearly that the arm 30 dipping down, by the adjusting screw 21 applied to its left end, moves the left end of the lever 20, making it dip); the lever 20 will dip down until it releases the pawl 19, of the lever 13, from its retention.

Once the pawl 19 is released, the lever 13 is urged leftwards by the spring 18: when the lever 13 moves leftward almost simultaneously, the following operations take place:

(a) the jack 16 releases the pawl 17 integral with the wheel and so the wheel itself starts to turn and, with it, the system comprising the axis-hand-cylinder;
(b) the hammer 24 beats against the bell 25;
(c) the switch 26 closes and lights the lamp 28 (of course, if it is desired to have the lamp lighted, the switch 27 should first be closed).

Brake device

Above the wheel 1, and perpendicularly to its axis, the lever 8 is pivotally mounted as at 9, which under the action of the spring 31 is urged downwards, so as to rest on the wheel 1 with the rubber pad 10 (fixed on the lever 8 in its nearly mid part) to stop the wheel from rotating.

In the starting position, the lever 8 is spaced from the wheel, because its left end rests on the step or shoulder 36 of the bell crank 32, pivotally mounted as at 33 (FIG. 2).

Manually pulling down the left end 37, of the crank 32, causes the crank itself to turn in counterclockwise direction of rotation (FIG. 2); so the upper part of the lever moves leftwards in the bifurcation 12 of lever 8 and the step 36 will release the lever 8. Once released, the lever 8 is urged downwardly by the spring 31 until it contacts with its rubber pad 10 on the wheel 1, which remains locked. In practice I can apply, directly, or by other connections, a key or a push-button to the end 37 of the lever 32. I can also (for example, by a connecting rod) apply the pedal 38 as schematically shown in FIG. 2.

It is also contemplated to apply below the end 37 (which, in this case, must be of ferromagnetic material) the electromagnet 39, which can be set in action even at a distance, by closing the switch 40.

Automatic brake

If, once the wheel has been set in motion, and the brake crank is not moved, the wheel itself, after doing the first half swing, following the laws of the pendulum, swings back and then it does a series of swings until it stops, as has been previously described.

To avoid this (since I am interested only in the first half swing) when the wheel 1, in the first half swing, is about to reach the position almost symmetric to the starting position, if it is not stopped before, it stops automatically. In fact the cylinder 7 hitting against the lower part of the arm 35 integral to the crank 32, will move this latter in counterclock-wise direction of rotation releasing the lever 8 and stopping the wheel 1.

Recharge of the device

After the operation as above described, the wheel 1, and therefore, the hand 5, remain locked in a certain position. To make the device work again, both the wheel and the various levers must be returned to their starting position as in FIG. 2.

The entire recharge mechanism can be seen clearly in FIG. 3. The shaft 51, concentric with the shaft 2 of the wheel 1, has integral therewith the pawl 42, the eccentric 50, the return spring 53, and the knurled knob 52.

Turning knob 52 by hand in the clockwise direction of rotation effects the charge of the device. In turning this knob, the following takes place: the eccentric 50 acts on the lever 43, which is pivotally mounted as at 44, making it turn in a counterclockwise direction of rotation in such a way that the pawl 49 fixed to the upper left end of the lever itself, can lift the brake lever 8 (which, once lifted, will remain in this position, because the lever 32 (see FIG. 2) pulled rightwards by the spring 34, will engage with the step 36, below the lever 8); continuing the counterclockwise direction of rotation of the lever 43, the pawl 49, after lifting the brake lever 8, will push lever 13 leftwards (FIG. 3) until the pawl 19, integral with lever 13 will be hooked by the joint lever 20 (the couples can be clearly seen in FIG. 2). Always continuing to turn the knurled knob 52, the pawl 42, integral and perpendicular to the axis of the knob itself, crosses and moves the extension pin 41, integral to the wheel 1 and therefore the wheel itself, making it turn in the direction of rotation of the knob 52 (as the brake of the wheel 1 is released).

Continuing to turn the knob 52, the wheel 1 will also turn, until its pawl 17 (clearly visible in FIG. 2) will step over the jack 16, remaining locked by the same.

At this point, a retainer of conventional form, not shown, prevents the knob 52 from further turning; then, the knob, the shaft 51, pawl 42, and eccentric 50 will be returned to the original position by the return spring 53 where it is locked in this position by another retainer, not shown.

During the clockwise direction of rotation of the knob 52, besides the previously described operations, the charge of the timer 29 takes place. When the eccentric 50, during its rotation causes the lever 43 to move in a counterclockwise direction of rotation, the cylinder 45 eccentrically mounted on shaft 47 revolves due to friction (achieved by the spring 46) under the charge lever 48, of the timer 29, thereby charges the timer itself. Cylinder 45 serves as an adjustable abutment on the lever 43, which during rotation of the lever about axis 44 initially moves upwardly in an arc causing upward swinging of the timer recharge lever 48. Due to the eccentric mounting of cylinder 45 on the shaft 47 and the action of the light spring 46, the cylinder has a limited freedom to rotate slightly on its shaft during the operation and its inherent vibration. This random rotation results in different maximum arc height of the abutment for the winding or recharge lever 48 and accordingly a lesser or greater winding action.

Therefore such charge never takes place in the same way, because the cylinder 45 has the hole out of center (and therefore its action is eccentric). When, during the charge, the cylinder rubs the lever 48, it does a light rotation round its axis 47. So, in the following charge, the lever 48 will be moved (and charged) more or less than the previous time, according to whether the eccentric 45 shows a greater or a lower eccentricity in comparison with the previous time.

Once the lever of the timer 29 has been charged, the discharge lever 30 of the timer itself will spend more or less time to let the device start after the charge (as I have described previously). This prevents the possibility of the operator, who has to use the device, from getting accustomed to a standard time delay (between the charge and the start of the device).

For simplicity it is assumed that the charge is effected by turning the knob 52 directly integral to the shaft 51 (FIG. 3), but the shaft 51 can also be connected (by gears, chains, etc.) to a hand grip, placed in a more accessible location; it can be connected to a small reducing motor, so the charge can take place automatically, closing the switch of the reducing motor; by an appropriate connection the shaft 51 can be moved by a hand grip of a common coin slot.

The exterior envelope of the device is not described since it may be of any form. The essential point is that the dial and the hand running on it, as well as the lamp are well visible.

Operation

The operator turns the hand grip 52 charging the whole device. After the charge, he will wait (the wait is variable from test to test) until the lamp lights or the bell rings. Then he will immediately pull down the key (or the pedal). On the dial, which is calibrated in seconds, the hand will stop in a certain position and it will show how long a time interval is passed between the lighting of the lamp and the "reaction" of the operator.

Calibration of the dial

Knowing the law of the motion of the system (wheel 1, shaft 2, hand 5, cylinder 7) turning around an axis, the dial itself may be calibrated.

In practice, it is a complex motion which, as I have already stated, depends on numerous factors. To avoid some arduous calculations I have followed this system:

By a cinecamera at high speed (for example, 100 frames a second), I film the hand of the device during its motion, framing simultaneously a precise chronometer at the hundredth of second (whose hand, for example, does a turn a second on a dial divided in 100 parts).

After photographic development, examining, in the succession of the photos, the various positions of the hand of the device, with reference to the various positions of the hand of the chronometer, I can calibrate the dial of the device itself in hundredths of second.

Obviously this description is only one of the many possible realizations of such a device.

While I have shown and described a preferred embodiment of the invention, it is to be understood that the drawings and detailed disclosure are to be construed in an illustrative rather than a limiting sense since various modifications and substitutions of equivalents may be made by those skilled in the art within the spirit and scope of this invention as defined in the appended claims.

What I claim as my invention and desire to protect by Letters Patent of the United States is:

1. Apparatus for measuring the physiological reaction time to a visual or acoustic stimulus comprising a heavy body mounted for rotation about an axis displaced from the center of gravity of said body, means to hold said body fixed in unstable equilibrium, signal means, release means including a timer to release said body to allow it to rotate due to the force of gravity after a predetermined time interval, manually actuated means for stopping the rotation of said body, and indicia means for indicating the time interval between the time said body begins its rotation and the application of said manually actuated stopping means, said release means including at least one lever connected to said timer and releasably engaging said body, said lever having means thereon to actuate said signal means whereby after a certain time interval, said lever releases the body and simultaneously activates said signal means.

2. Apparatus according to claim 1, wherein said indicia means includes an axle integral with said body and having a hand on a free end thereof and dial means associated with said hand.

3. Apparatus according to claim 1, wherein the body comprises a wheel and said stopping means comprises a brake acting frictionally on said wheel and actuated by a key adapted to be pulled down by a pedal.

4. Apparatus according to claim 1, wherein said stopping means comprises an electromagnetically operated brake actuated by a manual switch.

5. Apparatus according to claim 1, wherein said timer is of the manual wind recharge type, and means for rewinding said timer.

6. Apparatus as defined in claim 5, and further including a coin operated means for actuating said rewinding means.

7. Apparatus as defined in claim 5, wherein said rewinding means includes a winding lever extending from said timer, and an actuating arm, rotatably eccentric means on said actuating arm adjacent the said winding lever to move the same in random fashion upon movement of the actuating arm to reset the timer in order to prevent the operator from anticipating the release of said body.

References Cited

UNITED STATES PATENTS

| 1,494,986 | 5/1924 | Behm | 35—22X |
| 3,065,963 | 11/1962 | Dean | 35—22X |

FOREIGN PATENTS

| 618,785 | 4/1961 | Canada | 35—22 |

WILLIAM H. GRIEB, Primary Examiner

U.S. Cl. X.R.

273—1